(12) United States Patent
Adamczyk et al.

(10) Patent No.: US 7,760,860 B2
(45) Date of Patent: Jul. 20, 2010

(54) METHODS AND SYSTEMS FOR ENABLING A REPLY CALL TO A VOICE MAIL MESSAGE

(75) Inventors: Maria Adamczyk, Alpharetta, GA (US); Joel Brand, Danville, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1415 days.

(21) Appl. No.: 10/285,033

(22) Filed: Oct. 31, 2002

(65) Prior Publication Data

US 2003/0048885 A1 Mar. 13, 2003

(51) Int. Cl.
*H04M 1/64* (2006.01)
(52) U.S. Cl. ............... 379/88.23; 370/352; 379/69; 379/88.02; 379/88.18; 379/209.01; 455/445; 455/432.3; 455/555
(58) Field of Classification Search ............... 379/67.1, 379/69, 79, 86.18, 88.17, 88.18, 88.02, 88.2, 379/88.22, 88.23, 88.25, 207.02, 207.04, 379/209.01, 210.01; 370/352; 455/432.3, 455/445, 455
See application file for complete search history.

(56) References Cited

U.S. PATENT DOCUMENTS

| | | | |
|---|---|---|---|
| 4,930,152 A | 5/1990 | Miller | |
| 4,933,967 A | 6/1990 | Lo et al. | |
| 5,058,152 A | 10/1991 | Solomon et al. | |
| 5,353,331 A | 10/1994 | Emery et al. | |
| 5,361,295 A | 11/1994 | Solomon et al. | |
| 5,425,091 A | 6/1995 | Josephs | |
| 5,493,607 A | 2/1996 | Arumainayagam et al. | |
| 5,521,969 A | 5/1996 | Paulus et al. | |
| 5,572,583 A | 11/1996 | Wheeler, Jr. | |
| 5,664,010 A * | 9/1997 | Walker et al. | 379/221.07 |
| 5,680,442 A | 10/1997 | Bartholomew et al. | |

(Continued)

FOREIGN PATENT DOCUMENTS

EP 0255325 2/1988

(Continued)

OTHER PUBLICATIONS

Search Report PCT/US/05002.

(Continued)

*Primary Examiner*—Gerald Gauthier
(74) *Attorney, Agent, or Firm*—Thomas, Kayden, Horstemeyer & Risley, LLP

(57) ABSTRACT

Methods and systems for enabling a subscriber to reply to a voice mail message that has been made available for the subscriber at a voice mail system (VMS). In response to an indication, the VMS transmits a release message with respect to the subscriber's communication to the VMS, which communication then is terminated to an intelligent network element (INE). The INE originates a call to the party to whom the subscriber desires to reply. The subscriber's communication and the INE's call are bridged to form the reply call from the subscriber to the party. The VMS is not included in the call path. After the reply call is concluded, the bridge is dismantled, the IP is released, and the subscriber's communication is returned to interaction with the VMS without the subscriber having to make a separate call into the VMS.

8 Claims, 4 Drawing Sheets

U.S. PATENT DOCUMENTS

| | | | |
|---|---|---|---|
| 5,684,862 A | 11/1997 | Finnigan | |
| 5,692,033 A | 11/1997 | Farris | |
| 5,712,903 A | 1/1998 | Bartholomew et al. | |
| 5,717,742 A | 2/1998 | Hyde-Thomson | |
| 5,740,230 A | 4/1998 | Vaudreuil | |
| 5,740,231 A | 4/1998 | Cohn et al. | |
| 5,742,763 A | 4/1998 | Jones | |
| 5,742,769 A | 4/1998 | Lee et al. | |
| 5,742,905 A | 4/1998 | Pepe et al. | |
| 5,764,747 A | 6/1998 | Yue et al. | |
| 5,768,348 A | 6/1998 | Solomon et al. | |
| 5,790,637 A | 8/1998 | Johnson et al. | |
| 5,812,639 A | 9/1998 | Bartholomew et al. | |
| 5,812,670 A | 9/1998 | Micali | |
| 5,832,072 A | 11/1998 | Rozenblit | |
| 5,832,221 A | 11/1998 | Jones | |
| 5,838,768 A | 11/1998 | Sumar et al. | |
| 5,848,132 A | 12/1998 | Morley et al. | |
| 5,857,013 A * | 1/1999 | Yue et al. | 379/88.2 |
| 5,905,774 A | 5/1999 | Tatchell et al. | |
| 5,930,479 A | 7/1999 | Hall | |
| 5,940,478 A | 8/1999 | Vaudreuil et al. | |
| 6,005,845 A | 12/1999 | Svennesson et al. | |
| 6,064,723 A | 5/2000 | Cohn et al. | |
| 6,073,029 A * | 6/2000 | Smith et al. | 455/555 |
| 6,148,069 A | 11/2000 | Ekstrom et al. | |
| 6,169,795 B1 | 1/2001 | Dunn et al. | |
| 6,209,100 B1 | 3/2001 | Robertson et al. | |
| 6,226,359 B1 | 5/2001 | Montogomery et al. | |
| 6,233,318 B1 * | 5/2001 | Picard et al. | 379/88.17 |
| 6,243,374 B1 * | 6/2001 | White et al. | 370/352 |
| 6,285,879 B1 * | 9/2001 | Lechner et al. | 455/432.3 |
| 6,301,349 B1 | 10/2001 | Malik | |
| 6,317,484 B1 * | 11/2001 | McAllister | 379/88.02 |
| 6,330,079 B1 * | 12/2001 | Dugan et al. | 358/403 |
| 6,339,640 B1 * | 1/2002 | Chen et al. | 379/209.01 |
| 6,393,289 B1 * | 5/2002 | Bunting et al. | 455/445 |
| 6,396,909 B1 * | 5/2002 | Reksten et al. | 379/88.18 |
| 6,891,931 B1 * | 5/2005 | Adamczyk et al. | 379/69 |
| 7,327,835 B2 * | 2/2008 | Adamczyk et al. | 379/88.23 |
| 2003/0048885 A1 * | 3/2003 | Adamczyk et al. | 379/88.22 |
| 2004/0037402 A1 * | 2/2004 | Adamczyk et al. | 379/88.22 |
| 2005/0018823 A1 * | 1/2005 | Adamczyk et al. | 379/88.22 |

FOREIGN PATENT DOCUMENTS

| | | |
|---|---|---|
| EP | 0412799 | 2/1991 |
| EP | 0507125 | 10/1992 |
| EP | 0543235 | 5/1993 |
| EP | 0588101 | 8/1993 |
| EP | 588101 A2 | 3/1994 |
| EP | 0624967 | 11/1994 |
| EP | 0662762 | 7/1995 |
| EP | 0782304 A2 | 7/1997 |
| EP | 0782315 A2 | 7/1997 |
| EP | 0782316 A2 | 7/1997 |
| EP | 0813162 A2 | 12/1997 |
| EP | 0825752 A2 | 2/1998 |
| EP | 0841796 A2 | 5/1998 |
| EP | 0843453 A2 | 5/1998 |
| EP | 0886228 A2 | 12/1998 |
| EP | 0841796 A3 | 8/1999 |
| WO | WO 97/08901 | 3/1997 |

OTHER PUBLICATIONS

"Die T-Net-Box- der Anrufbeantworter im Netz", XP-000861610, 1998.

"Voice Services on the Intelligent Network: Intelligent Peripherals and Service Nodes", F. Bosco , XP-000607359, Aug. 1992.

"The Belcore and ITU-T Call Model Operations", XP-002141946, 1998.

"Transactions in Intelligent Networks", XP-002141947, 1998.

"General Recommendations on Telephone Switching and Signalling—Introduction to Intelligent Network Capability Set 1", International Telecommunication Union, XP-002141945, Mar. 1993.

"An Enhanced Message Networking Topology: Multimedia Messaging with the Intuity™ Interchange Server," Bell Labs Technical Journal, Apr.-Jun. 1998, pp. 124-135.

* cited by examiner

METHODS AND SYSTEMS FOR ENABLING A REPLY CALL TO A VOICE MAIL MESSAGE

RELATED APPLICATION

The present application claims priority to and the benefits of the prior-file co-pending and commonly owned provisional application entitled "Method and System for Live Replying to a Voice Mail Message", filed in the United State Patent and Trademark Office on Feb. 26, 1999, assigned application Ser. No. 60/121,923 and incorporated herein by reference. The present application also claims priority to and the benefits of the prior-filed copending and commonly owned application entitled "Methods and Systems for Enabling a Reply Call to a Voice Mail Message", filed in the United States Patent and Trademark Office on Feb. 25, 2000, assigned application Ser. No. 09/511,864 and incorporated herein by reference.

FIELD OF THE INVENTION

The present inventions relate to the field of telecommunications, and particularly, relate to the use of voice messaging systems in an Advanced Intelligent Network (AIN) of a communications system.

BACKGROUND

A person typically uses a telephone answering machine or a voice mail service to provide a caller with an opportunity to leave a message should the person be unavailable to take the call. On a busy day, a number of messages may be accumulated and made available for retrieval. As the person goes through the accumulated messages, he or she may simply listen to some of the messages. With respect to other messages, the person may desire to speak directly to the callers in "live calls to the callers". In other words, the person may desire to make a reply call to one of the callers who left the person a message.

There are several different ways in which a person may make a reply call to a caller who left a message. A first way to make a reply call is referred to herein as "listen-to-all messages". In this way, the person listens through all of the messages (taking notes as necessary), and makes the reply call only after finishing with the accumulated messages. If the person subscribes to a voice mail service, then after the person's call to the voice mail service to retrieve the messages, the person places another call so as to make the reply call to the caller of one of the messages. If the person uses an answering machine, then after the last message is played, the person may place a call to make the reply call.

This listen-to-all messages way of making a reply call has at least three disadvantages. First, the person has to listen through or otherwise take time with all of his or her messages. The time it takes to get through all of the messages is at least the delay experienced by the person in making the reply call. Second, the person may have to take notes (perhaps at least to capture the telephone number of the caller) while going through the messages so as to keep track of which messages need a reply, to what directory number to reply, etc. Third, the person, after the reply call has been concluded, may desire to return to the messages or to the voice mail functions. In that case, the caller may have to call back into the voice mail system or otherwise access the answering machine.

This third disadvantage may require a four stage process in the making of a reply call and getting back to messages or answering machine functions: (1) call into the service or run the answering machine; (2) exit the service or terminate the answering machine functions; (3) make the reply call; and (4) call back into the service or otherwise access the answering machine functions.

Another way to make a reply call is referred to herein as the "urgent-reply". The urgent-reply method may be used to avoid at least one of the disadvantages of the "listen to all" method in making a reply call. Pursuant to the urgent-reply method, the reply call is made as soon after listening to the relevant message as desired. For example, a caller may have left an urgent message for the person. As soon as the person gathers the urgency of the message and the relevant call-back information, the person may initiate the reply call. This urgent-reply method may avoid some aspects of the first of the disadvantages of the listen-to-all method of making a reply call in that the person does not have to listen to all of the messages before making a reply call.

But like the listen-to-all method, to make the reply call pursuant to the urgent reply method, the person still has to gather enough information to dial the call, etc. This may involve taking notes. In addition, the person may have made the reply call per the urgent-reply method and missed the remainder of his or her accumulated messages. In that case, the person has to call into the voice mail system or otherwise access the answering machine.

Yet another way of making a reply call is referred to herein as "bounce-back", which is generally available only from advanced voice mail systems. Such an advanced voice mail system requires the person to call-in for messages, allows a reply call to be made after a particular message, and then allows the person to return to the voice mail service without the person having to make another call into the system. The bounce-back method may be implemented through the use of a platform such as an intelligent peripheral (IP) that maintains control over the person's call into the system and over the reply call. One manner in which to maintain control is to bridge the person's call into the system with the reply call to the caller who left the message. After the reply call is finished, then the bridge may be torn down, and the person may return to a review of messages or other voice mail functions.

But the manner in which bounce-back allows the person to return to the voice mail service without having to make a separate call into the system has drawbacks. Maintaining control over the person's call into the system and the reply call (by making a bridge or otherwise) has the effect of including the platform as an element in the call path. By remaining an element in the call path, the platform takes up resources of the telecommunications network. In addition, by remaining an element in the call path, the platform may limit, if not eliminate, its own resources to take other calls for the person. Rather than being able to take another call for the person, the platform may be effectively "busy". Whether the resources that are taken up are those of the telecommunications network, the platform, or the voice mail service, the result of the take-up in resources is an increase in cost in at least operations of the platform and service.

Accordingly, there is a need for a solution that allows a person to make a reply call to a message left by a caller without the person having to listen through all of the messages, without the caller having to make a call into the voice mail system or otherwise activate the voice mail service in order to continue a review of messages or use other features of the service after the conclusion of the reply call, and without an implementing device of the voice mail service being included as an element in the call path while the caller is making the reply call.

SUMMARY

Generally stated, the present inventions relate to methods and systems for enabling a subscriber to make a reply call to a voice mail message that has been made available for the subscriber at a voice mail system (VMS). More particularly, the methods and systems of the present inventions enable a subscriber, who has called into the voice mail system and retrieved a message, to make a reply call to the originator of the voice mail message. While the subscriber is making the reply call, the VMS is not included in the call path. After the reply call is concluded, the subscriber may be returned to interaction with the VMS without the subscriber having to make a separate call into the VMS.

Even more particularly, assume a subscriber has indicated a desire to make a reply call to a voice mail message retrieved from the VMS. In response to the indication, the VMS transmits a message indicating a release of the subscriber's communication by the VMS. The message may also indicate at least a telephone number (reply telephone number) to which the reply call is to be directed. The message may be or may be a part of a GR-1129 message, and the message may include a Remote Operations (RO) parameter with information related to the reply call such as the reply telephone number, an identifier for implementation of a reply call, and/or the subscriber's directory number. The release message effectively removes the VMS from further involvement with the subscriber's communication or with the reply call (at least until the reply call is disconnected and the subscriber's communication is reconnected to the VMS).

The message from the VMS may be received by the service switching point (SSP) serving the VMS (SSP of VMS), which in turn, routes the message (or the information from the message) to a service control point (SCP). In response, the SCP directs the SSP of VMS to route the communication to the subscriber's directory number. A reason for first routing the communication to the subscriber's directory number is to have the communication appear as if it is being made from a line corresponding to the subscriber's directory number. The communication is to appear as if it is being made from the subscriber's directory number for purposes of creating a billing record billing the subscriber, who has elected to make a reply call to a voice mail message.

In the course of routing the subscriber's communication to the subscriber's directory number, the communication is routed to the SSP serving the subscriber's directory number (subscriber's SSP). The subscriber's SSP pauses in the processing of the communication and queries the SCP for instructions. The SCP then instructs the subscriber's SSP to route the communication for termination to an intelligent network element (INE) such as an intelligent peripheral (IP). The INE is provided with the reply telephone number.

In response to the termination of the subscriber's communication to the INE, the INE initiates a call to the reply telephone number. The INE also bridges the subscriber's communication and the INE's call to form the reply call. As a result of the bridge between the subscriber's communication and the INE's call, the subscriber is provided with a reply call to the reply telephone number. Advantageously, the VMS is not involved in this reply call from the subscriber through to the reply number. The release of the VMS from the subscriber's communication frees up the VMS for other calls, reduces use of the infrastructure of the communications network by obviating the connections of the subscriber's communication to the VMS, and otherwise improves the efficiency of processing the reply call.

Another advantage of the present inventions is that they provide methods and systems to connect the subscriber to the VMS for the interaction with the VMS after disconnection of the reply call without the subscriber having to make a separate call into the VMS.

Generally, to connect the subscriber for interaction again with the VMS, the reply call is monitored for a disconnect signal such as a disconnect event, the input of particular digits, or the like. The bridge between the subscriber's communication and the INE's call is dismantled so as to disconnect the INE's call to the reply telephone number. Instructions may be obtained with respect to the subscriber's communication so the subscriber's communication is routed to the VMS without the subscriber having to call back into the VMS.

More particularly, the INE, which includes the bridge between the subscriber's communication and the INE's call to form the reply call, monitors the reply call for a disconnect signal. In response to the disconnect signal, the INE dismantles the bridge so as to disconnect the INE's call to the reply telephone number. The INE may provide a release message to the SSP serving the INE so as to indicate the INE's withdrawal or release from usage with respect to the subscriber's communication. The SSP serving the INE may obtain instructions with respect to the subscriber's communication. The subscriber's communication is transmitted by the SSP serving the INE to the VMS. As a result of the disconnection of the INE's call and the INE's release from the subscriber's communication, the communication is available for connection for interaction with the VMS. Advantageously, the subscriber does not have to make a call back into the VMS to continue to interact with the VMS, but the subscriber may simply hang on after disconnection of the reply call to be routed back to the VMS.

That the present inventions and the exemplary embodiments accomplish the features of the present inventions will become apparent from the detailed description of the exemplary embodiments and the drawings that follow.

DETAILED DESCRIPTION

The exemplary embodiments of the present inventions provide methods and systems for enabling a subscriber to make a reply call to a voice mail message that has been made available for the subscriber at a voice mail system (VMS). More particularly, the methods and systems of the present inventions enable a subscriber, who has called into the voice mail system and retrieved a message, to make a reply call to the originator of the voice mail message. After the reply call is concluded, the subscriber may be returned to interaction with the VMS without the subscriber having to make another call into the VMS.

Exemplary Environment for Exemplary Embodiments

The exemplary embodiments of the present inventions are used, preferably, with a region-wide messaging (RWM) system, as described in greater detail below. Nevertheless, the present inventions may be used with any type of messaging system with the appropriate functionality.

The RWM system described herein may allow a subscriber to the messaging system within the region of the service provider to send, receive, forward, and reply to messages, including voice mail messages and Voice Profile for Internet Mail (VPIM) Messages. Subscribers may receive messages from other subscribers and non-subscribers. Subscriber-to-subscriber messaging, however, illustrates the advanced features of the RWM system, which may be available, such as: (1) each subscriber may send a message to another subscriber; (2) each subscriber may reply to a message received from another subscriber; (3) each subscriber may reply to a telephone message received from a non-subscriber by implementing a feature that dials the non-subscriber; and (4) each subscriber may receive and reply to Internet voice messages or fax messages.

Figure 1:
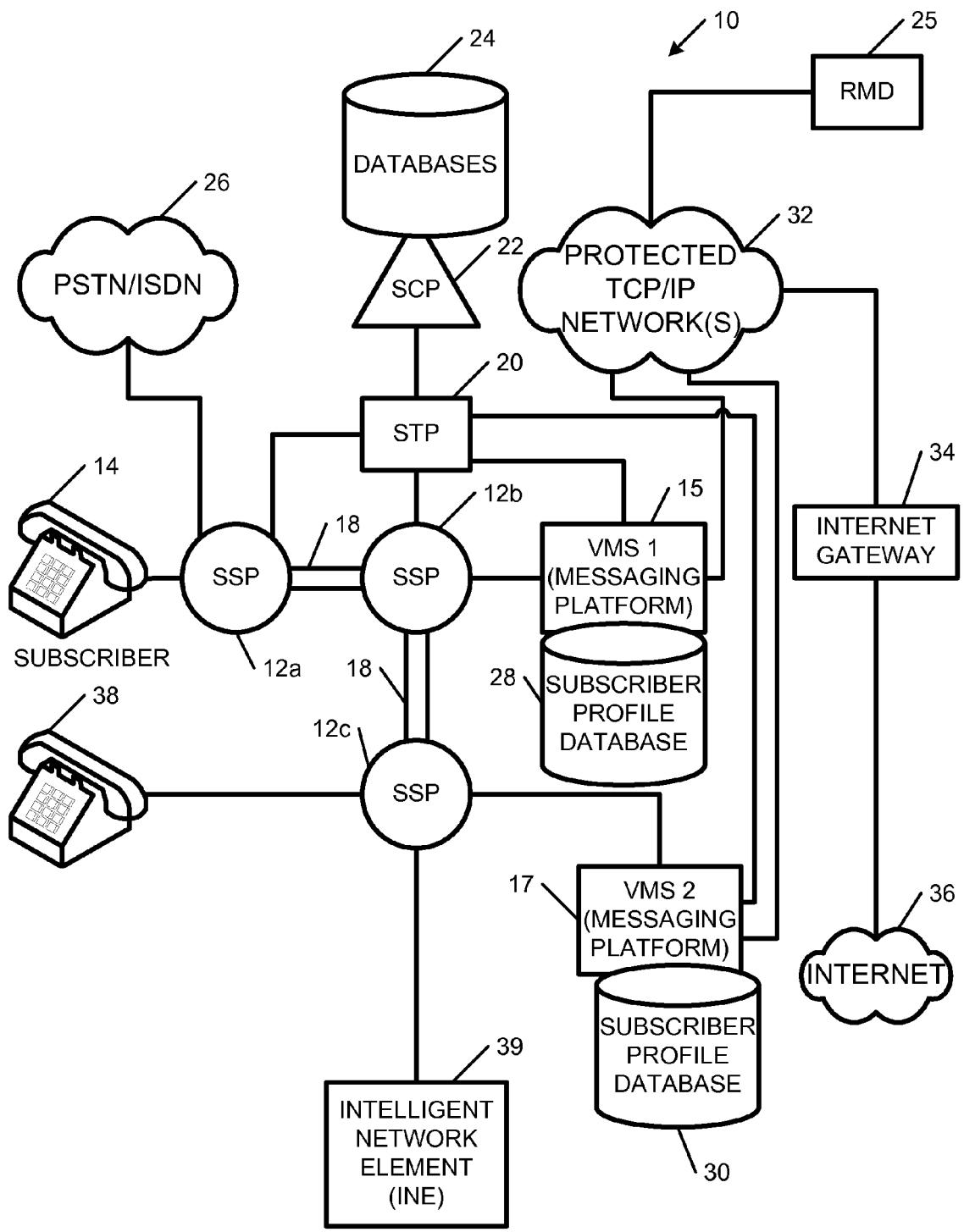
FIG. 1 is a block diagram of an exemplary messaging system such as a region-wide messaging system that may be used in connection with the present inventions.

Exemplary RWM System—FIG. 1

FIG. 1 is a block diagram of an exemplary RWM system 10 (also referred to as a telecommunications messaging network). The network 10 includes a variety of interconnected network elements. A group of such elements includes the plurality of end offices which are indicated as service switching points (SSPs or switches) 12a, 12b, 12c. An SSP typically includes switch functionality, but also includes other functionality so as to communicate with other network elements, and in particular, with Advanced Intelligent Network (AIN) elements. SSP 12a and SSP 12c are each coupled to a subscriber line, which also may be referred to as a line or a calling line. Each SSP 12a, 12b, 12c serves a designated group of lines, and thus, the SSP that serves a particular line may be referred to as its serving switch. The line is typically connected to a piece of terminating equipment including telephones 14, 38. Although telephones 14, 38 are illustrated as the terminating equipment, those skilled in the art will understand that such terminating equipment may include other telecommunications devices including, but not limited to, facsimile machines, computers, modems, etc. End offices may further be coupled through a tandem office (not illustrated), which may be used to connect and switch circuits between and among end offices.

Each active line in an AIN is assigned a ten digit (NPA-NXX-XXXX) line number regardless of whether seven or ten digits are dialed to reach the subscriber. A line number is commonly referred to as a telephone number or a directory number.

SSP 12b is connected by trunks to a voice mail system (VMS) (messaging platform) 15. (These trunks use Signaling System 7 signals for call set-up and other actions.) SSP 12c is connected by trunks to a voice mail system (VMS) (messaging platform) 17.

SSPs 12a, 12b, 12c are interconnected by a plurality of trunk circuits 18. These are the voice path trunks that connect the SSPs to connect communications. In addition to connections to other elements, each of the SSPs is connected to a local signal transfer point (STP) 20 via respective data links. Currently, these data links employ a signaling protocol referred to as Signaling System 7 (SS7). Much of the intelligence of the AIN resides in a service control point (SCP) 22 that is connected to STP 20 over an SS7 data link. Among the functions performed by the SCP 22 is the maintenance of network databases and subscriber databases as represented collectively by databases (subscriber data) 24. The system 10 also may include intelligent network elements (INEs) such as the INE 39 illustrated as connected to SSP 12c. An INE may be an intelligent peripheral (IP) such as a service node (SN) (sometimes referred to as a service circuit node). An INE may include voice and dual tone multi-frequency (DTMF) signal recognition devices and voice synthesis devices. The INE 39 may be connected to the SSP 12c through a data link using an X.25 or other protocol and typically may be connected to one or more SSPs via an integrated service Digital Network (ISDN) links.

In order to keep the processing of data and calls as simple as possible, a relatively small set of triggers is defined at the SSPs for each call. A trigger in the AIN is an event associated with a particular call that generates a packet to be sent to an SCP. The SCP queries its databases or service package applications (SPAs) for processing instructions with respect to the particular call. The results are sent back to the SSP in a response from the SCP 22 through STP 20. The return packet includes instructions to the SSP as to how to process the call. The instructions may be to take some special action as a result of a customized calling service or an enhanced feature. In response to the instructions, the SSP moves through the remaining call states, may encounter further triggers, and generates further packets that are used to set up and route the call. Similar devices for routing calls among various local exchange carriers are provided by regional STP (not illustrated) and by regional SCP (not illustrated) which may be connected to STP 20, SCP 22, and/or to the elements described herein through the public switched telephone network (PSTN) 26.

When a messaging subscriber (such as the person or entity using telephone 14) subscribes to a messaging service, an entry or a record is created in a VMS such as VMS 15. Each VMS 15, 17 includes subscriber administration, message retrieval, send, reply, forward, and mailbox maintenance functions, among others. Each VMS 15, 17 includes or is functionally connected respectively to a subscriber profile database 28, 30 (subscriber data). Each subscriber profile database stores subscriber-specific profile information (subscriber information) for retrieval by VMS functions. The VMSs 15, 17 are elements of the messaging system or service. To the protected TCP/IP network(s) 32 described below, each of the messaging platforms 15, 17 look like a valid TCP/IP element. In support of this, the VMSs 15, 17 may be assigned a TCP/IP (or IP) address and/or a domain name. Generally, the TCP/IP or other address or domain name of the VMS 15, 17 may be stored in a region-wide messaging directory (RMD) 25 discussed below, or may be stored on some domain name server (not illustrated) either in the protected TCP/IP network(s) 32, in some other element, or as a separate element. In further support of this TCP/IP capability, the VMSs 15, 17 may also provide operations access to mail administrative destinations, in addition to subscriber messaging mailbox destinations. In addition, each VMS 15 or 17 is an SS7 network element and as such is assigned an identifier such as a directory number, a destination point code (DPC) or the like.

The VMSs 15, 17 communicate with the SSP and the SCP according to the AIN 0.2 Switch—Intelligent Peripheral Interface Generic Requirements—1129-CORE Specification, AINGR: Switch—Intelligent Peripheral Interface (IPI) (A module of AINGR, FR-15); Document Number:

GR-1129; Issue Number: 03; Updates: REV01—October 1998; Issue Date: September 1997; Product Type: Industry Requirements and Standards (RS); Component of FR-15, ("GR-1129") which is incorporated herein by reference. This GR-1129 describes the use of a Remote Operations (RO) parameter for indicating the invocation of a supplementary service. The RO parameter may be used to allow the SCP 22 and the VMSs 15, 17 to share information.

In this messaging service, TCP/IP messaging is allowed via a private Transmission Control Protocol/Internet Protocol (TCP/IP) network (protected TCP/IP network(s)) 32. The VMSs 15, 17 through the network 32 may use a Light-weight Directory Access Protocol (LDAP) to communicate with other elements such as a domain name server (not illustrated) and/or directories such as RMD 25 to obtain information with respect to the proper destination/recipient of a message.

An Internet gateway 34 provides secure access between the private TCP/IP network 32 and the Internet 36. The gateway 34 limits the access of VPIM traffic to and from the Internet 36. In addition, the gateway 34 performs authorized LDAP messaging directory lookups to route messages received from the Internet 36.

Advantageously, a subscriber's line number generally may be the subscriber's mailbox number associated with a messaging platform rendering service to the subscriber in the RWM system. In other words, a message addressed to the subscriber may include the subscriber's line number, which may also be the subscriber's mailbox number. Alternatively, the subscriber's mailbox number may relate to some other identifier associated with the subscriber. The subscriber's address may be based on the ten digit directory number (DN) using an International Telecommunications Union (ITV) Standard E.164 compliant address.

FIG. 1 also illustrates the exemplary use of a region-wide messaging directory 25 (RMD or directory) in the messaging system 10. The RMD 25 is functionally connected to the other elements of the messaging system 10 through inclusion in or a connection to the TCP/IP network 32. Although the RMD 25 is illustrated as connected to the system 10 through the TCP/IP network 32, the RMD 25, or course, may be connected to the system 10 in other ways or even be included in an element of the system such as in association with the directories 24 of SCP 22. An RMD provides high-speed directory look-up for messaging subscribers. Generally, an RMD stores information so as to determine which messaging platform of the RWM system serves which subscriber. Additional information on the manner in which the RMDs of the messaging system 10 store information on messaging platforms and subscribers and how RMDs interact with a network element 51 may be obtained from the commonly assigned and owned patent application entitled "Methods and System for Determining Message Routing Based on Elements of a Directory Number", which was filed with the United States Patent and Trademark Office on Dec. 13, 1999 and assigned Ser. No. 09/459,498, and which was filed with the United States Receiving Office pursuant to the Patent Cooperation Treaty (PCT) on Dec. 13, 1999 and assigned Application No. PCT/US99/29491 and which application is herein by reference.

Of course, an RMD may keep track of other information relating to subscribers of the RWM system. In particular, the RMD may act as both a client and a server with respect to the Light-weight Directory Access Protocol (LDAP). The RMD stores subscriber, service, and other messaging data. In addition, the RMD supports the LDAP attributes field for LDAP clients to choose the fields that they desire to retrieve from the server. Clients may retrieve the subscriber profile from the RMD.

Subscriber data may be stored in the RMD in the following exemplary fashion:

| Description/Directory Field | LDAP DN Attribute |
| --- | --- |
| Subscriber's Mailbox Number | CN (Common Name) |
| Name Announcement | Spoken Name |
| MDSBlocking | N/A |

Subscriber data is used to look up subscribers in the RMD. The data is also used for the purposes of routing and billing a subscriber's calls and messages to and from the messaging platforms.

Service data may be stored in the RMD in the following exemplary fashion:

| Description/Directory Field | LDAP DN Attribute |
| --- | --- |
| VMS ID | VMSID |
| VMS DAP Number | VMSDN |
| VMS Domain | Domain |
| VoiceEncoding | N/A |
| LATA | N/A |
| State | N/A |
| StateLATA | N/A |
| LDAP Credentials | Hidden in LDAP query |
| VMS IP address | Hidden in LDAP query |

The service data contains messaging platform-specific information to perform certain checks during directory lookup and call/message routing. The RMD may also store service provider data to ensure that a service provider has access to only its authorized subscribers' information.

Figure 2:
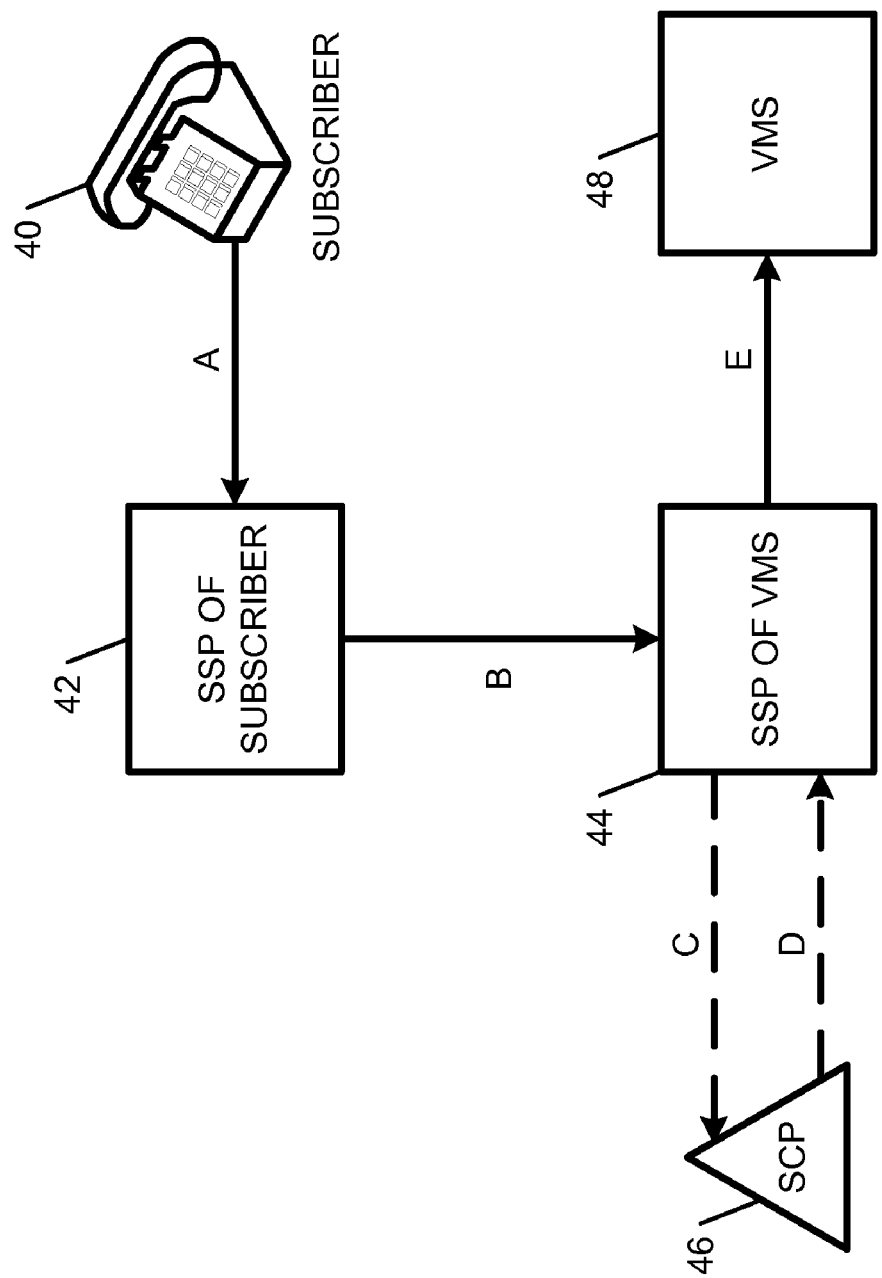
FIG. 2 is a block diagram illustrating the exemplary routing of a communication from a subscriber to a VMS to retrieve a voice mail message.

Subscriber's Retrieval of a Message—FIG. 2

Generally stated, the present inventions relate to methods and systems for enabling a subscriber to make a reply call to a voice mail message that has been made available for the subscriber at a voice mail system (VMS).

FIG. 2 is a block diagram illustrating the exemplary routing of a communication from a subscriber to an exemplary VMS to retrieve a voice mail message. Solid arrows and crosshatched arrows in the figures illustrate the call path of a communication. Dashed arrows illustrate the paths between or among elements in the exchange of data or control signals.

Subscriber 40 dials a "pilot" or "administration" number, which also may be referred to as a messaging access telephone number. As indicated by solid arrow A, the subscriber's communication is routed to the service switching point serving the subscriber ("subscriber's SSP") 42. As indicated by solid arrow B, the subscriber's SSP routes the subscriber's communication to the SSP serving the VMS ("SSP of the VMS") 44. The communication encounters a specific digits string ("SDS") trigger provisioned on the SSP of the VMS 44 with respect to the pilot number. The SDS trigger causes the SSP of the VMS 44 to launch a TCAP Info_Analyzed query including the called number and the calling number to an SCP 46 as indicated by dashed arrow C.

In response to receipt of the query, the SCP 46 accesses a table (or other data source) to determine instructions for further routing of the call. In particular, the SCP 46 uses the called number in the query to determine the address of the voice mail system (VMS) 48 for routing of the subscriber's communication. As indicated by dashed arrow D, the SCP 46, using a TCAP STR-IP message including a destination address for the VMS, instructs the SSP of the VMS 44 to route the call to the VMS 48. As indicated by solid arrow E, the SSP of the VMS 44 routes the subscriber's communication to the VMS 48. The SSP of the VMS 44 uses an ISUP IAM message including the directory number of the VMS 48 as the called number, and the directory number of the subscriber as the calling number. The VMS uses the calling number (i.e., the subscriber's directory number) to access the subscriber's voice mailbox and to make any message therein available to the subscriber.

Thus, the call path of the subscriber's communication to retrieve his or her voice mail messages from the VMS 48 is illustrated by the solid arrows A, B, and E of FIG. 2. In particular, the call path is from: the subscriber's equipment 40 to the subscriber's SSP 42 (arrow A); the subscriber's SSP 42 to the SSP of the VMS 44 (arrow B); and then the SSP of the VMS 44 to the VMS 48 (arrow E).

Figure 3:
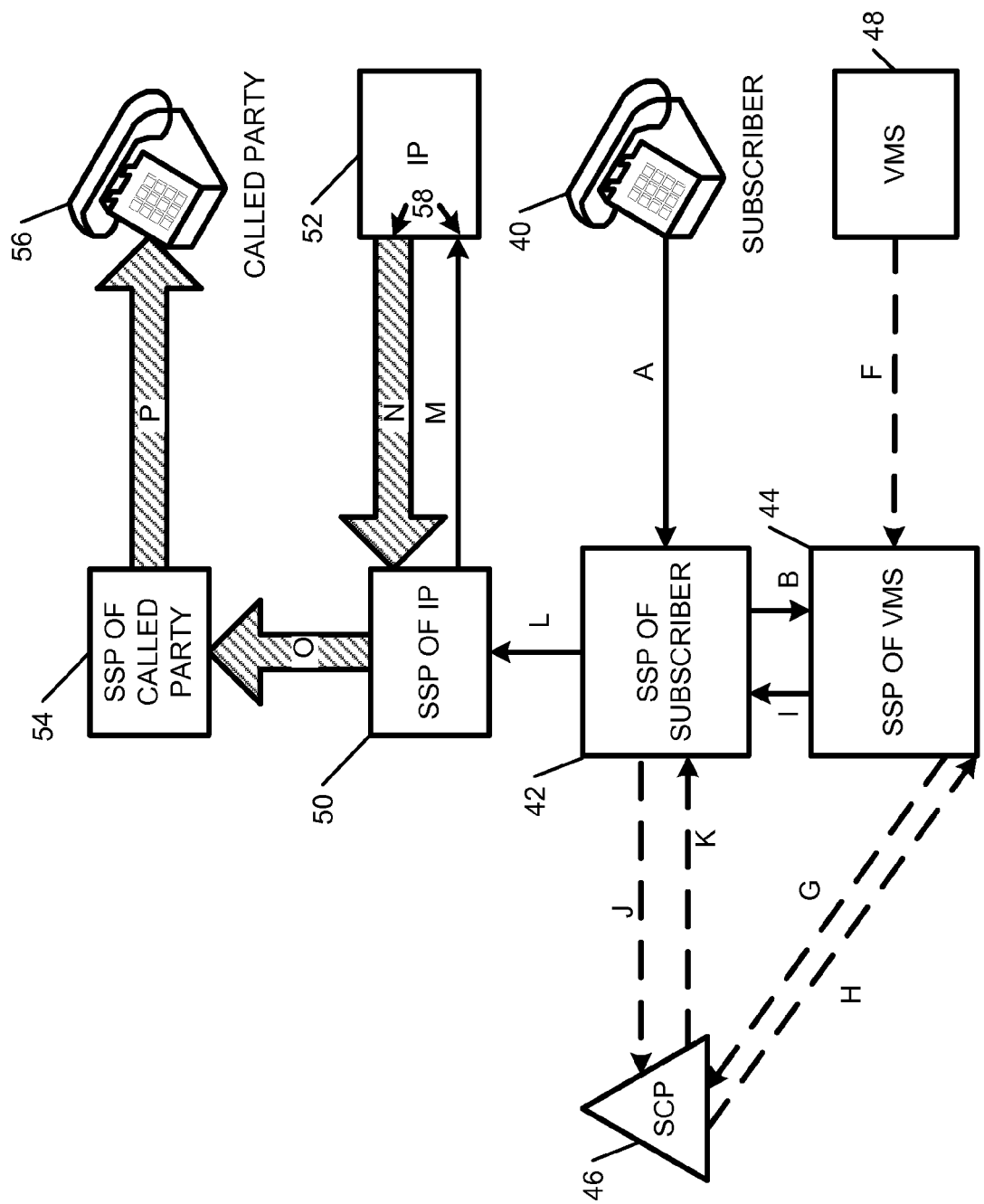
FIG. 3 is a block diagram illustrating an exemplary reply call from the subscriber to the reply telephone number without the involvement of the VMS in the reply call.

Exemplary Reply Call—FIG. 3

FIG. 3 is a block diagram illustrating an exemplary reply call from the subscriber to the reply telephone number without the involvement of the VMS in the reply call. Assume for this example that the subscriber has decided to make a reply call (a "live call") to a called party who left him or her a voice mail message. To indicate that the subscriber desires to make a reply call to a particular voice mail message, he or she provides some indication to the VMS 48 such as the input of a particular code. Generally, the code may be input by the subscriber while the subscriber is listening or reviewing the particular message, or after the end of the particular message. The subscriber may input this code and make a reply call to a message even though other messages are awaiting review by the subscriber. In sum, the subscriber does not have to wait until all of the messages have been reviewed or otherwise reach the end of the accumulated messages in order to make a reply call to a particular message.

Assume the subscriber desires to make a reply call to a particular message, but fails to provide his or her indication with respect to making a reply call to a particular message while reviewing or at the end of the particular message. Then the subscriber may have to provide the VMS 48 with some information to identify the particular message to which the subscriber desires to make a reply call. For example, assume the subscriber reviews all of his or her ten messages, and decides to make a reply call to the third message. The subscriber may provide the VMS 48 with the information that he or she desires to make a reply call with respect to the third message.

The VMS 48 notes the receipt of the indication [AudioDTMF[nn]] that the subscriber desires to make a reply call to a message. In response, as indicated by dashed arrow F, the VMS 48 sends an ISUP Release (ISUP REL) message to the SSP of the VMS 44. The message is a release of the subscriber's communication by the VMS 44. The message may be a GR-1129 message and may include a remote operations (RO) parameter with three fields: (1) an identifier for implementation of a reply call (which may be characterized as an identifier of an operation type and abbreviated as "OperType"); (2) a destination number (DestNumber) for the reply call which may be referred to as the reply telephone number (which may be included by the VMS as taken from the information associated with the message to which the subscriber is making the reply call); and (3) a subscriber number that identifies the subscriber with respect to his or her mailbox and/or for billing purposes. The release message effectively removes the VMS 48 from further involvement with the subscriber's communication or with the reply call (at least until the reply call is disconnected and the subscriber's communication is transmitted to the VMS).

The message from the VMS 48 is received by the SSP of the VMS 44, which, in turn, transmits a TCAP Resource_Clear (TCAPResClear) message to the SCP 46 as indicated by dashed arrow G. The message from the SSP of the VMS 44 to the SCP 46 may include the message from the VMS 48 or the relevant parts thereof such as the RO parameter including identification of the operation to be implemented (i.e., reply call), the reply telephone number, and the subscriber's directory number.

In response to receipt of the message from the SSP of the VMS 44, the SCP 46 analyzes the message and determines that an operation is to be implemented with respect to the subscriber's communication. In this example, the operation to be implemented is a reply call and the reply call is to be made to the called party number. Accordingly, the SCP 46, as indicated by dashed arrow H, sends a TCAP Analyze_Route (TCAPAnalRte) message to the SSP of the VMS 44, which instructs the SSP of the VMS 44 to route the subscriber's communication to the subscriber's directory number. The message from the SCP 46 sets the called number to the subscriber's directory number. The SCP 46 also includes at least the reply telephone number (for example, as the redirecting number) and may include the other information from the RO parameter in its message to the SSP of the VMS 44.

As noted, the SCP 46 directs the SSP of the VMS 44 to route the subscriber's communication to the subscriber's directory number. A reason for first routing the communication to the subscriber's directory number is to have the communication appear as if it is being made from a line corresponding to the subscriber's directory number. The communication is to appear as if it is being made from the subscriber's directory number for purposes of creating a billing record billing the subscriber, who has elected to make a reply call to a voice mail message. Of course, if there is no reason to route the communication first to the subscriber's directory number, then the communication may be routed directly to the reply telephone number.

The SSP of the VMS 44 uses an ISUP message in routing the communication to the subscriber's directory number. In the course of the routing, the communication is directed to the SSP serving the subscriber's directory number (subscriber's SSP) 42, where a termination attempt (TAT) trigger is encountered with respect to the subscriber's directory number. The subscriber's SSP 42 pauses in the processing of the communication and queries the SCP 46 for instructions by using a TCAP termination attempt (TCAP TermAttempt) message. The message from the subscriber's SSP 42 may include the message or the relevant information from the message (i.e., the RO parameter information) relating to the reply call such as provided by the VMS 48 and including an identifier for the operation to be implemented, the reply telephone number, and the subscriber's directory number. The transmission of the query from the subscriber's SSP 42 to the SCP 46 is illustrated in FIG. 3 by the dashed arrow J.

The SCP 46 examines the information received in the TCAP TermAttempt message, and determines that the communication is an outdial call. The SCP 46 then uses a TCAP Forward_Call message, as indicated by dashed arrow K, to instruct the subscriber's SSP 42 to route the communication for termination to an intelligent network element (INE) such as an intelligent peripheral (IP) 52. As indicated by solid arrow L, the subscriber's SSP 42 routes the subscriber's communication to the SSP of the IP 50. The subscriber's SSP 42 uses an ISUP IAM message with the called number as the directory number of the IP 52 and including the information of the RO parameter. As indicated by solid arrow M, the SSP of the IP 50 then terminates the subscriber's communication to the IP 52. The SSP of the IP 50 uses a PRI Setup message and includes the information of the RO parameter.

At this point in the implementation of the reply call to the message as indicated by the subscriber, the call path of the subscriber's communication does not include the VMS 48. In particular, at this point, the call path is illustrated in FIG. 3 as from: the subscriber's equipment 40 to the subscriber's SSP 42 (arrow A); the subscriber's SSP 42 to the SSP of the IP 50 (arrow L); and the SSP of the IP 50 to the IP 52 (arrow M). (In some cases, the call path also may include the SSP of the VMS 44).

In response to the termination of the subscriber's communication to the IP 52, the IP 52 initiates a call to the reply telephone number ("IP's call"). The IP's call is initially routed from the IP 52 to the SSP of the IP 50 as indicated by cross-hatched arrow N and uses a PRI Setup message. From the SSP of the IP 50, the IP's call is routed, as illustrated by cross-hatched arrow 0, to the SSP serving the reply telephone number ("called party's SSP") 54. The called party's SSP 54 further routes the IP's call to the equipment of the called party 56 as indicated by cross-hatched arrow P. Thus, the call path of the IP's call is from: the IP 52 to the SSP of the IP 50 (arrow N); the SSP of the IP 50 to the called party's SSP 54 (arrow O); and the called party's SSP 54 to the called party 56 (arrow P).

In addition, the IP 52 connects or merges the subscriber's communication and the IP's call such as by making a bridge 58, or otherwise, to form the reply call. As a result of the bridge 58 between the subscriber's communication and the IP's call, the subscriber is provided with a reply call to the reply telephone number.

Advantageously, the VMS 48 is not involved in this reply call from the subscriber through to the reply number. The release of the VMS 48 from the subscriber's communication frees up the VMS 48 for other calls, reduces use of the infrastructure of the communications network by obviating the connections of the subscriber's communication to the VMS 48, and otherwise improves the efficiency of processing the reply call.

Figure 4:
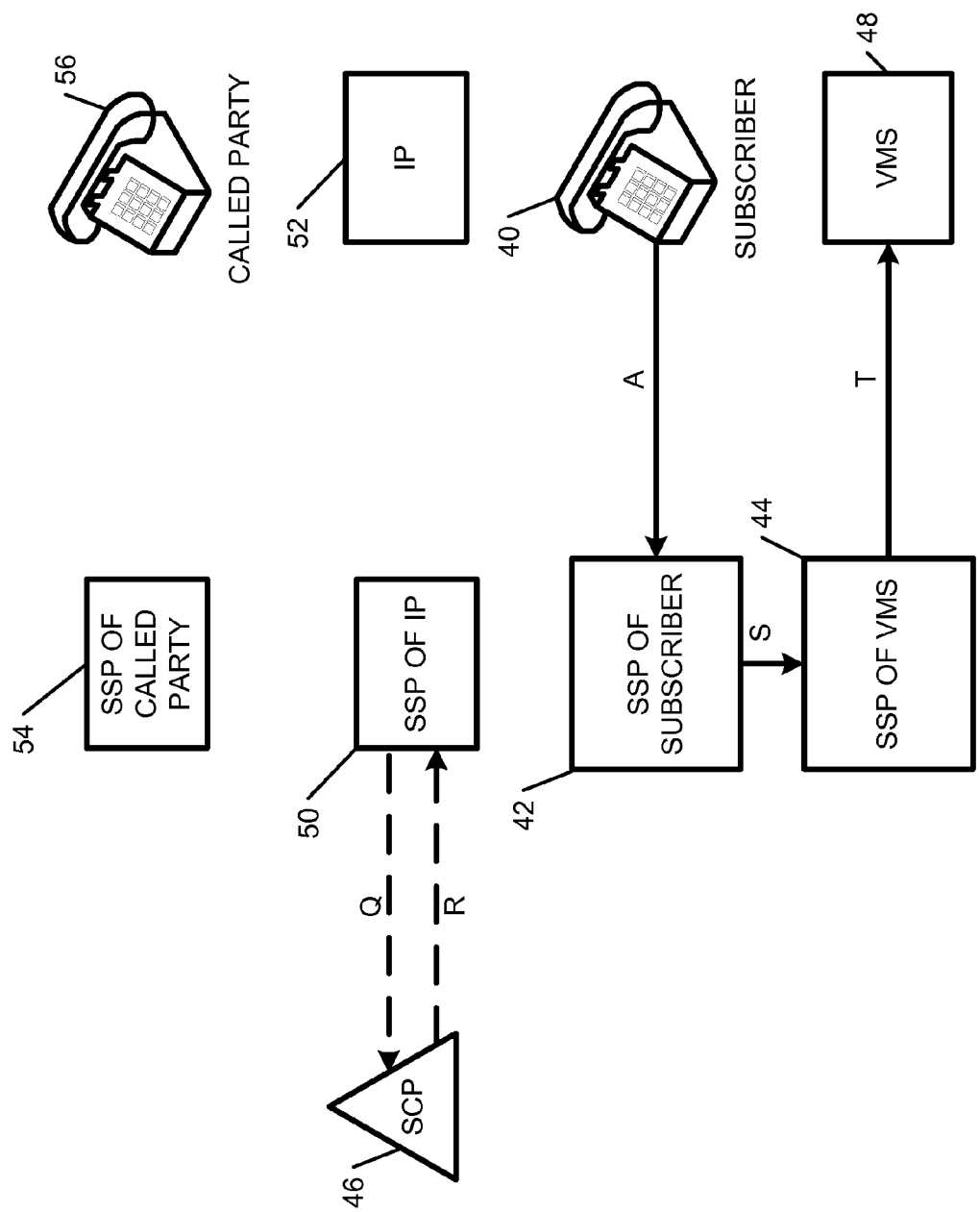
FIG. 4 is a block diagram illustrating an exemplary connection of the subscriber's communication for interaction with the VMS after the disconnection of the reply call and without the subscriber having to call back into the VMS.

Exemplary Connection for Interaction with the VMS—FIG. 4

An advantage of the present inventions is that they provide methods and systems to connect the subscriber to the VMS 48 for interaction with the VMS 48 after disconnection of the reply call without the subscriber having to make a separate call into the VMS.

Generally, to connect the subscriber for interaction (after a reply call) with the VMS 48, the reply call is monitored by the IP 52 for a disconnect signal such as a disconnect event, the input of particular digits, or the like [AudioDTMF "*"]. In response to a disconnect signal, the IP 52 disconnects the called party 56 so as to disconnect the IP's call. The bridge between the subscriber's communication and the IP's call is dismantled so that only the subscriber's communication remains. The IP 52 releases the subscriber's communication, which is then routed to the VMS 48.

FIG. 4 illustrates the exemplary environment of FIG. 3, but after the IP 52 has received a disconnect signal, has disconnected the called party, and only the subscriber's communication remains. Unlike FIG. 3, there is no call path from the IP 52 to the SSP of the IP 50, nor a call path from the SSP of the IP 50 to the called party's SSP 54, and no call path from the called party's SSP 54 to the called party 56.

Once the IP 52 disconnects the IP's call, the IP 52 sends an ISUP Release (ISUP) message to the SSP of the IP 50. The SSP of the IP 50 obtains instructions in a query/response exchange with the SCP 46 with respect to the subscriber's communication (dashed arrows Q and R). In particular, the subscriber's communication is processed so as to route the communication to the VMS 48 without the subscriber having to call back into the VMS.

The subscriber's communication is routed by the SSP of the IP 50 to the directory number of the VMS 48. Solid arrow S from the subscriber's SSP 42 to the SSP of the VMS 44 and solid arrow T from the SSP of the VMS 44 to the VMS 48 (as well as arrow A from the subscriber 40 to the subscriber's SSP 42) illustrate that the call path of the subscriber's communication has been returned to that illustrated by arrows A, B, and E of FIG. 2 when the subscriber 40 was in communication with the VMS 48. Advantageously, the subscriber does not have to make a call back into the VMS 48 to continue to interact with the VMS 48, but the subscriber may simply hang on after disconnection of the reply call to be routed back to the VMS 48.

Conclusion

From the foregoing description of the exemplary embodiments of the present inventions and operations thereof, other embodiments will suggest themselves to those skilled in the art. Therefore, the scope of the present invention is to be limited only by the claims below and equivalents thereof.

We claim:

1. A method to connect a subscriber to a voice mail system (VMS) after disconnection of a reply call to a reply telephone number, the method comprising:

monitoring the reply call replying to a voice mail message left on the VMS for a disconnect signal, the reply call being formed by a subscriber communication that originates with the subscriber and terminates with an intelligent network element (INE) bridged to a call to the reply telephone number; and in response to the disconnect signal, dismantling the bridge so as to disconnect the reply call to the reply telephone number, sending an integrated services digital network (ISDN) user part (ISUP) message to a service switching point (SSP) to obtain instructions in an exchange with a service control point (SCP), and routing the subscriber communication from the INE to the VMS, whereby the subscriber may be connected with the VMS after the disconnection of the reply call to the reply telephone number.

2. The method of claim 1, further comprising:

prior to routing the subscriber communication to the VMS, obtaining instructions with respect to the subscriber's communication, and following the instructions in routing the subscriber communication to the VMS.

3. The method of claim 1, wherein the reply call to the reply telephone number is monitored for the disconnect signal.

4. The method of claim 2, wherein the instructions with respect to the subscriber communication are obtained from the subscriber.

5. The method of claim 1, wherein the reply call is monitored for input of particular digits.

6. A system to connect a subscriber to a voice mail server (VMS) after disconnection of a reply call to a reply telephone number, the system comprising:

an intelligent network element (INE) operative to monitor the reply call replying to a voice mail message left on the VMS for a disconnect signal, the reply call being formed by a subscriber communication originating with the subscriber and terminating with the INE bridged to the reply telephone number, and in response to the disconnect signal, to dismantle the bridge so as to disconnect the reply call to the reply telephone number; and a service switching point (SSP) serving the INE, the SSP being operative to route the subscriber communication from the INE to the VMS, where the subscriber may be connected with the VMS at the disconnection of the reply call, and where in response to dismantling the bridge, an integrated services digital network (ISDN) user part (ISUP) message is sent to the SSP to obtain instructions in an exchange with a service control point (SCP).

7. The system of claim 6, further comprising:

a service control point (SCP); and wherein the SSP is operative, prior to routing the subscriber communication to the VMS, to obtain instructions with respect to the subscriber communication, and following the instructions in routing the subscriber communication to the VMS.

8. A method to connect a subscriber to a voice mail server (VMS) after disconnection of a reply call to a reply telephone number, the method comprising:

receiving a message with respect to the disconnection of the reply call to the reply telephone number, the reply call replying to a voice mail message left on the VMS, the reply call being formed by a subscriber communication originating with the subscriber and terminating with an intelligent network element (INE) bridged to the reply telephone number; and in response to receiving the message, causing the subscriber communication to be routed from the INE to the VMS so that the subscriber communication follows a path from the subscriber to the VMS, where in response to disconnection of the reply call, an integrated services digital network (ISDN) user part (ISUP) message is sent to a service switching point (SSP) to obtain instructions in an exchange with a service control point (SCP).

* * * * *